Aug. 4, 1931.    L. H. BLOOD    1,817,607
THREADING MACHINE
Filed Jan. 4, 1930    5 Sheets-Sheet 1

Inventor
LOUIS H. BLOOD
By *A. K. Parsons*
Attorney

Aug. 4, 1931.     L. H. BLOOD     1,817,607
THREADING MACHINE
Filed Jan. 4, 1930     5 Sheets-Sheet 3
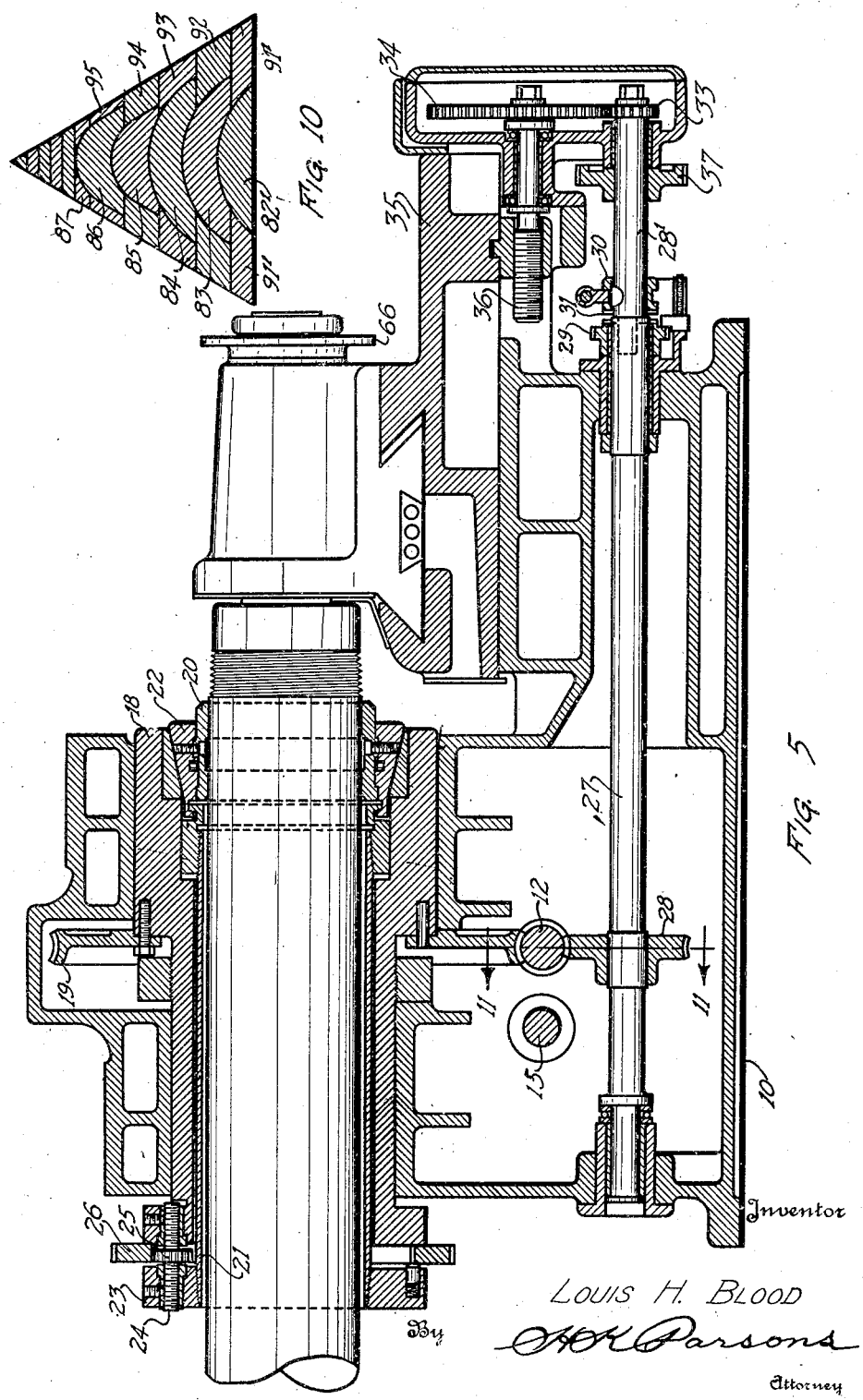
Inventor
LOUIS H. BLOOD
By
Attorney Aug. 4, 1931.  L. H. BLOOD  1,817,607
THREADING MACHINE
Filed Jan. 4, 1930  5 Sheets-Sheet 4
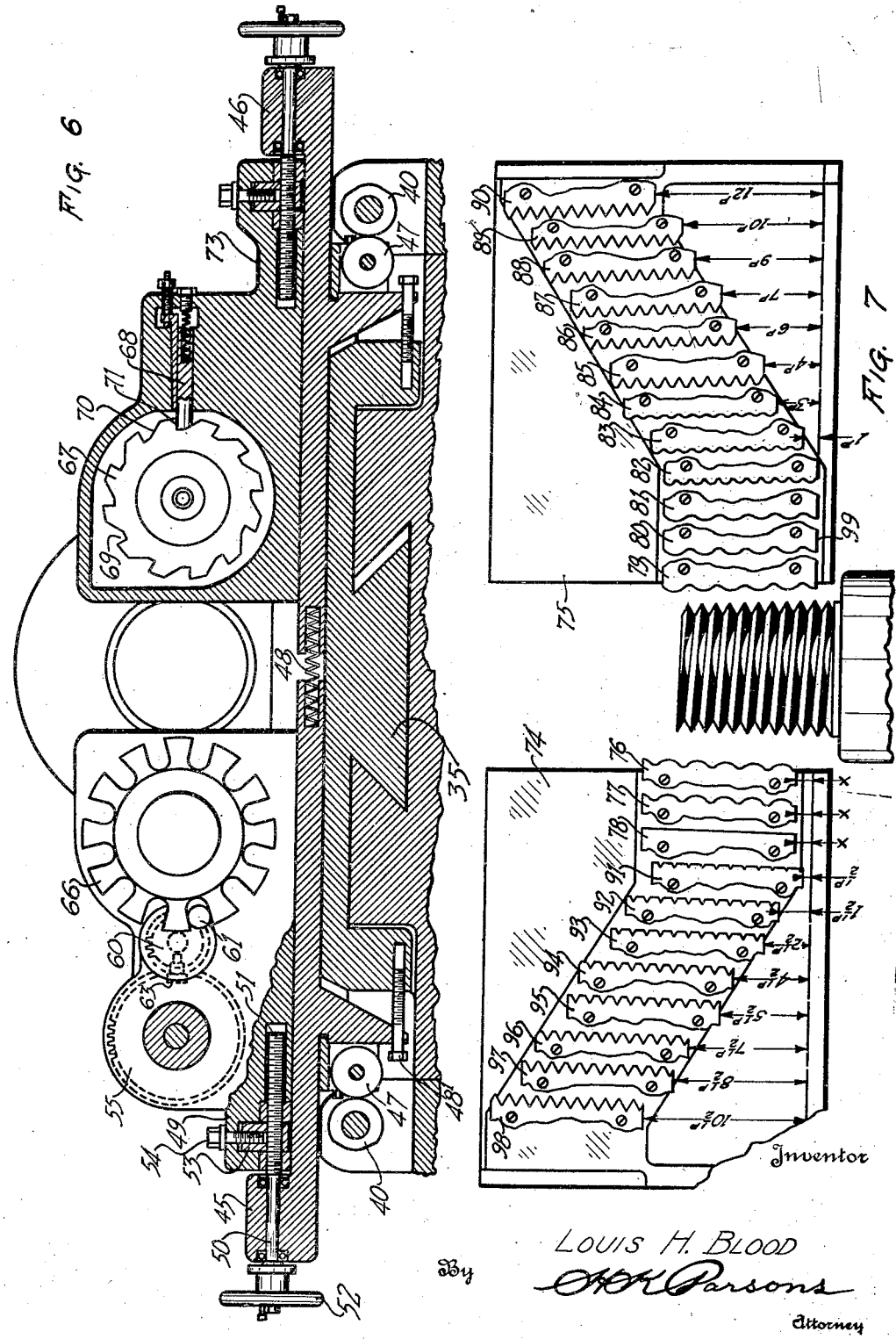
Inventor
LOUIS H. BLOOD
By AHK Parsons
Attorney Aug. 4, 1931.  L. H. BLOOD  1,817,607

THREADING MACHINE

Filed Jan. 4, 1930   5 Sheets-Sheet 5

Inventor
LOUIS H. BLOOD
By A. H. Parsons
Attorney

Patented Aug. 4, 1931

1,817,607

UNITED STATES PATENT OFFICE

LOUIS H. BLOOD, OF CINCINNATI, OHIO

THREADING MACHINE

Application filed January 4, 1930. Serial No. 418,459.

This invention relates to threading machines and more particularly to improvements in the method and machines for cutting threads of large diameter such as pipe threads which cannot be readily cut with a threading die.

One of the objects of this invention is the provision of a new and improved method and apparatus for cutting threads of a large pitch.

A further object of this invention is the provision of an improved cutting mechanism for manufacturing screw threads by making a series of roughing and finishing cuts to gradually increase the depth of the thread.

Another object of the invention is to provide a new method of cutting threads which consists in making a series of alternate roughing and finishing cuts to partially complete the thread and then a series of finishing cuts to complete the thread.

A still further object of the invention is the provision of a new and improved cutter head for threading machines and more particularly for pipe threading machines.

Other objects and advantages of the present invention should be readily apparent by reference to the following specification considered in conjunction with the accompanying drawings illustrative of one embodiment thereof, but it will be understood that any modifications in the specific structural details hereinafter disclosed may be made, within the scope of the appended claims without departing from or exceeding the spirit of the invention.

In carrying this invention into effect there is provided a pair of indexable cutter heads mounted on the opposite sides of a rotating work piece and each cutter head is provided with a series of chasers which will alternately index into cutting position, and so arranged that the chasers on the other side make a series of finishing cuts to gradually increase the depth of the thread. The roughing and finishing cuts alternate with one another and this is accomplished by reciprocating the cutter heads into and out of cutting position, the sequence of steps being that while the first cutter is operating upon the work the other cutter head is backed out, indexed and returned during the time of one-half revolution of a work piece.

During the next half of a revolution of the work piece both cutters are working. While the work is making a third half of a revolution the first cutter head is backed out, indexed and returned during which time the second cutter continues to work. Since the cutter heads are moved to the same position each time they are reciprocated into cutting position the increase in the depth of cut is effected by providing each succeeding chaser on a cutter head with cutting teeth which project a little further into the work than the preceding chaser. This does away with the necessity of providing a complicated variable infeed mechanism and results in a simpler and more accurate machine.

The invention will be further described in connection with the accompanying drawings in which like reference numerals indicate like parts.

Figure 5 is a vertical section on the line 5—5 of Figure 1.

Figure 6 is a vertical section on the line 6—6 of Figure 1.

Figure 7 is a developed view of the cutter heads showing the relative spacing of the chasers.

Figure 10 is an enlarged detail showing the succession of cuts taken by the chasers in forming a thread.

Figure 11 is a section on the line 11—11 of Figure 5.

Figure 1:
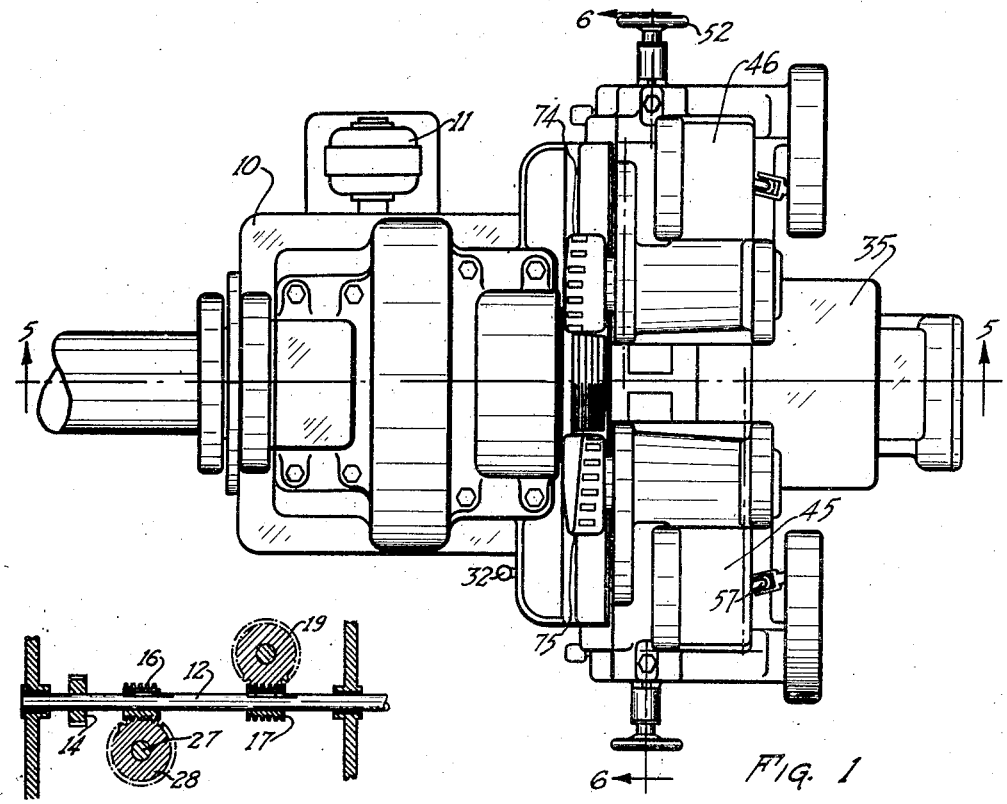
Figure 1 is a plan view of the machine.
Figure 2:
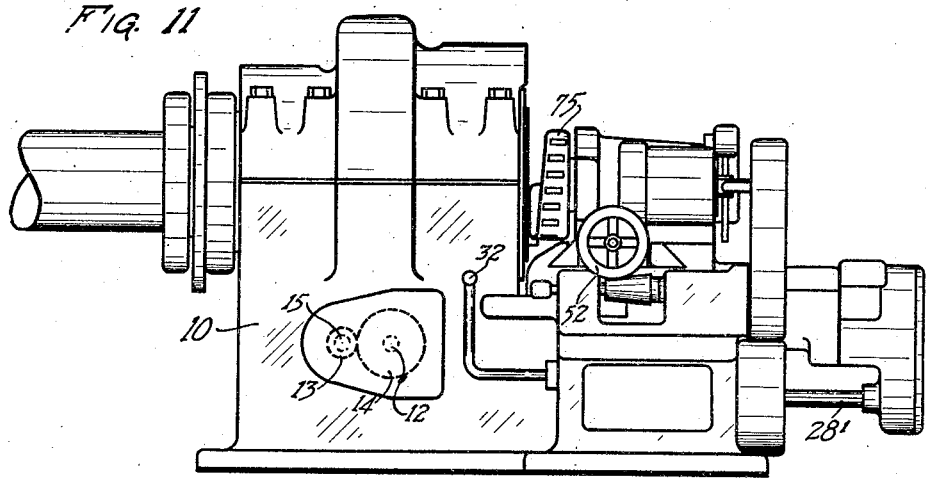
Figure 2 is a front elevation of the machine.

Referring to the drawings and especially Figures 1, 2 and 5 the reference numeral 10 represents the base of the machine on which is mounted the motor 11 for driving the main shaft 12 through the change gears 13 and 14 mounted on the end of the motor shaft 15 and the main shaft 12 respectively.

The main shaft is provided with two worms 16 and 17, the worm 17 driving the spindle 18 through the worm wheel 19. The spindle 18 is horizontally journaled in the upper part of the machine and carries at one end the work holding chuck 20. An internal sleeve 21 is provided in the member 18 and has threaded on one end a grooved collar for engaging the jaws 22 of the chuck and the other end has threaded thereon a collar 23 by means of which the sleeve is longitudinally moved to open and close the jaws 22. The collar 23 is provided with a plurality of threaded studs 24 circumferentially spaced thereon which are also threaded into the member 18 and each stud has integrally mounted thereon a pinion 25 for engagement with the floating internal gear member 26. Upon rotation of the member 26 by means of a reversible motor not shown, the pinions 25 are simultaneously rotated to force the collar 23 rearwardly and thus operate the chuck.

The construction is such that the gear 26 rotates with the member 18 when it is being driven by the prime mover, but may be independently rotated when the member 18 is stationary.

The worm 16 previously referred to rotates the shaft 27 through the worm gear 28 attached thereto. The shaft 27 is journaled in the base of the machine and has mounted on one end for free rotation a gear 29. A shaft 28' has one end telescopically journaled in the shaft 27 and the other end journaled in the frame of the machine and carries the slidable clutch member 30 splined thereon having a projecting rib 31 for engagement with diametrical slots in the end of shaft 27 and the gear 29 thus connecting them together in driving relation. The clutch 30 is operated by the handle 32 shown in Figure 2 and by movement of the clutch to the left as shown in Figure 5 the shaft 27 will be connected to drive the gear 29 which in turn through trains of gears 32' and 33' drive the indexing mechanism for the two cutter heads respectively. It is also seen that by this same movement the shaft 27 will be connected to drive the shaft 28'.

The carriage 35 which is slidably mounted upon the base of the machine is reciprocated by the lead screw 36 driven from the shaft 28' through change gears 33 and 34, the shaft 28' being driven by the shaft 27 to feed the carriage 35 to the left as shown in Figure 5, but to return the carriage the clutch 30 is disengaged and the shaft 28' is rotated in the opposite direction by means of the spur gear 37 attached thereto and driven by a reversible motor not shown. This allows the carriage to be returned without disturbing the relative location of the cutter heads which will be described later. The change gears 33 and 34 are provided so that the feed of the screw 36 may be varied for cutting threads of different pitch.

Since the transmission and indexing mechanism for each cutter head is the same only one will be described.

Figure 3:
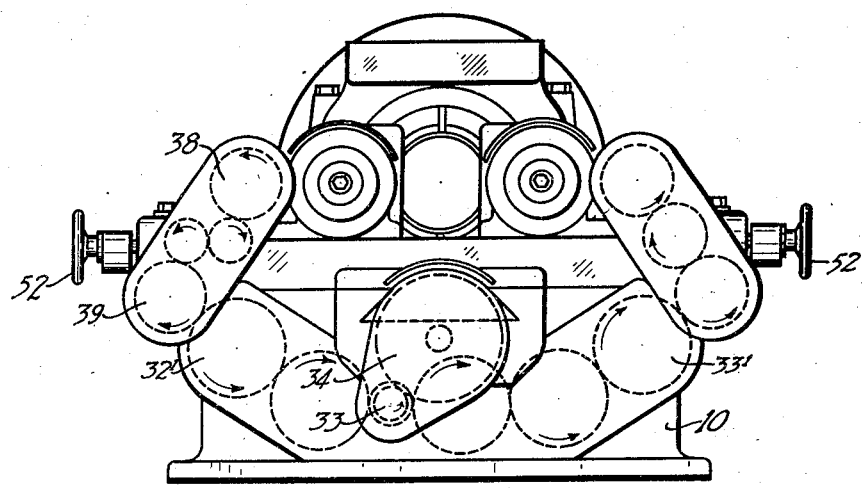
Figure 3 is an end elevation of the machine as viewed from the right in Figure 1.

The train of gears 32' shown in Figure 3 actuate the gear 39 which in turn operates a cam 40 journaled in a stationary part of the machine.

The cam 40 is longitudinally tapered to suit the taper of the thread being cut. Since the cam 40 has to be changed with each size of thread, provision is made for the interchangeability of these cams. A removable stub shaft 41 is provided which has one end journaled in the frame of the machine and the other end telescopically engaging the shaft 42 upon which the gear 39 is keyed and held in driving engagement therewith by the draw bolt 43. The shaft 42 has a diametrical slot in one end for receiving a projecting rib 44 of the cam 40 for driving the same.

Slidably mounted upon the carriage 35 are the cross slides 45 and 46 which carry the cutter heads and indexing mechanism therefor. Each slide is moved toward the work by a cam 40 engaging a roller 47 mounted on the slide and returned from the work by the spring 48 which is mounted in a bore in each of the opposing faces of the slides 45 and 46. It will be noted from Figure 6 that each cam 40 has a depressed portion on one third of its circumference which means that for one third of a revolution of either cam the slide connected therewith will be in a returned or non-cutting position and for two thirds of a revolution it will be in a cutting position.

A bolt 48' threaded in the slide 35 is provided for holding the slide 45 in against the pressure of the spring 48 when changing cams. Manual means are provided for adjusting the cutter head slide 49 on the cross slide 45 and comprises the shaft 50 journaled in the slide 45 and having a screw threaded end 51 in engagement with the cutter head slide 49 and a handle 52 on the other end for effecting the adjustment.

This arrangement provides for adjustment of the cutter head to suit the size of the work. A locking means for the slide 49 is provided which consists of the block 53 vertically slidable therein, and through which the threaded part 51 of the shaft 50 extends. A bolt 54 mounted in the slide 49 has threaded engagement with the upper end of the block so that upon turning the bolt in one direction the block 53 will be moved into binding engagement with the threaded portion 51 of the shaft 50 and thereby lock the slide in adjusted position.

The indexing mechanism for the cutter head is driven by the gear 38 journaled in a fixed part of the machine which in turn is driven by the gear 39 through intermediate pinions. A hollow cam drum 56 is journaled in the slide 49 and has fixedly mounted upon one end the gear 55. A universal extensible coupling 57 connects the gear 38 and cam 56 in driving engagement. Rotatably mounted in a bushing 58 parallel with the drum 56 is a shaft 59 having on one end a gear 60 in driving engagement with the gear 55 and having mounted on the other end a ball bearing crank pin 61. The sleeve 58 is provided with a pin 62 having a ball bearing roller 63 which engages a cam groove 64 located in one end of the cam drum 56. The cam groove is so shaped that upon rotation of the drum 56 the sleeve 58 will be reciprocated back and forth carrying with it the shaft 59 and the crank pin 61. Since the ratio of the gears 55 and 60 is two to one, the sleeve 58 will be reciprocated back and forth once for each two revolutions of the shaft 59.

The cutter head spindle 65 is journaled in the slide 49 and is provided upon one end with a radially slotted member 66 for indexing the same. The crank pin 61 is adapted upon reciprocation of the bushing 58 by the cam drum 56 to move into the plane of the member 66 and upon continued rotation to engage one of the slots thereof to index the same. The action here is similar to a Geneva motion. After the indexing has been performed the pin 61 is moved out of the plane of the member 66 by the cam 64 and makes a complete revolution before returning to perform another indexing movement. The shaft 59 being continuously rotated while the machine is running, the two to one gear ratio is provided between the gears 55 and 60 in order to speed up the indexing movement.

The spindle 65 is provided upon the other end with a locking plate 67. This plate has a series of notches corresponding in number with the radial slots in the member 66. There is provided in the slide 49 a spring pressed plunger 68 which is movable radially with respect to the member 67 for engagement with the notches 69 thereof. The notches 69 are cut in such a manner that the member 67 can rotate in only one direction with respect to the pin 68, the arrangement being such that upon an indexing movement taking place the bevel surface 70 of a notch 69 will cause the plunger 68 to retract. Upon its return when the next notch comes around it will properly position the member 67 and also the cutter head with respect to the work. The spindle 65 and member 67 are rotated in a direction which is opposite to the direction of movement which would be caused by the reaction of the cutting force and the shoulder 71 engaging against the side of the pin 68 prevents any return movement of the member 67 when the cutter engages the work. In other words, the face 71 bearing against pin 68 absorbs the reaction of the cutter with the work.

The cross slide 46 and cutter head slide 73 are similar in construction with the slides 45 and 49 and are indexed and moved in a similar manner so that the description need not be repeated.

Figure 8:
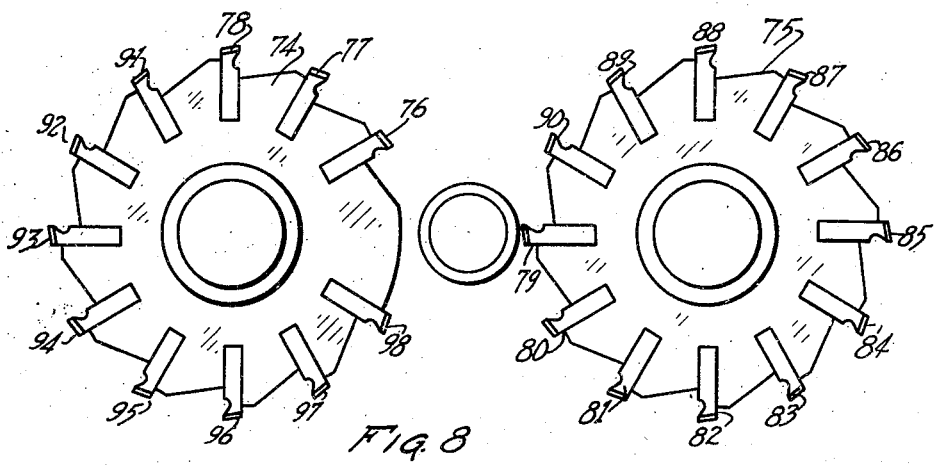
Figure 8 is a detail view of the cutter heads.
Figure 9:
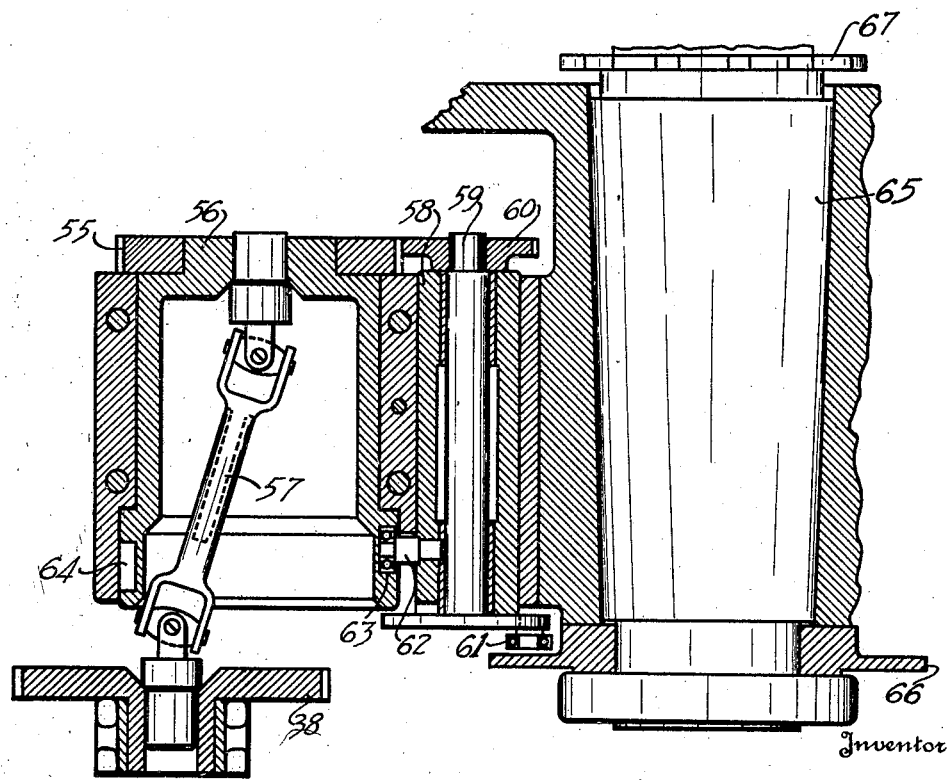
Figure 9 is a detail view showing the indexing mechanism for a cutter head.

Mounted upon the cross slides are the cutter heads 74 and 75 which are shown in expanded view in Figure 7. Referring to Figures 7 and 8 the cutter head 74 has the blades 76, 77, 78 and the head 75 has the blades 79, 80, 81 all of which with the exception of blade 78 are used for rough turning the end of the work and the blade 78 is used to make a finishing cut which reduces the end of the tube to the approximate taper and outside diameter of the pipe thread to be cut thereon.

It will be noted that the blades 76, 77, 79, 80 and 81 have a series of ridges and valleys upon them but the member of these is immaterial so long as the ridges on one cutter head are opposite to the valleys on the other cutter head.

It will also be noted that since in this case all of these roughing cutters are made the same only the set on one cutter head is moved longitudinally with respect to the cutters on the other cutter head thereby bringing the ridges of one set opposite to the valleys of the other set. After these six cutting blades have effected their work and the surplus stock has been removed from the end of the tube the threading chasers come into operation.

Mounted upon the head 75 is the series of thread cutting tools or chasers 82 to 90 inclusive and upon the head 74 the series of tools or chasers 91 to 98 inclusive. The sequence in which these chasers operate is as follows:

The chaser 82 engages the work and removes a chip such as 82' shown in Figure 10, followed by the chaser 91 on cutter head 74 which removes the chip such as 91' shown in Figure 10. It will be noted from this that the chaser 82 operates as a roughing cutter to remove the central portion between the sides of two potential threads and the cutter or chaser 91 operates to complete the size of the thread to the desired width but only for a limited depth. Chasers 83, 84, 85 and 86 on the cutter head 75 and the chasers 82, 93, 94 and 95 on the cutter head 74 alternate in cutting in a similar manner to the chasers 82 and 91 removing chip sections in the order 83', 92', 84', 85', 94', 86', 95. The bottom portion of the threads are completed by a series of parallel cuts made by the chasers 87, 96, 88, 97, 89, 98 and 90 in that order.

It will be noted from Figure 7 that the thread cutting chasers are set back with respect to one another. This is necessary due to the mode of operation of the machine.

The leading edges 99 of the cutters 79, 80, 81 and 82 are about 8 pitches removed from the inner end of the thread to be cut upon starting the machine and the cutter heads 74 and 75 are in the relative position shown in Figure 8, and it will be noted in that figure that there is a blank space in the cutter head 74 there being no cutter at that point.

As has been previously described the cutting heads are alternately shifted toward and away from the work piece intermediate their several indexing movements. By omission of a cutter at one of the index stations of the work head 74 this member may, by the normal shifting mechanism, be moved into its proximate position as respects the work piece and at the same time have an appreciable clearance with respect thereto. At the same point in the cycle, head 75 will be shifted outwardly or retracted with respect to the work so that its cutter is also in work disengaging or clearing position. Consequently, with the machine stopped at this point, a completed work piece may readily be removed and a new work piece inserted without contact with or interference from the cutter blades, after which the new cycle of operations may be satisfactorily initiated, head 75 being moved inwardly to bring its cutter in operative engagement with the new work piece, while head 74 is retracted and indexed to bring its initial cutter to operating station.

When the machine starts the cutter 79 on the cutter head 75 is moved into cutting engagement with the work by the cam 40 while at the same time cutter head 74 is retracted, indexed and returned. This latter operation occupies the time of one half of a revolution of the work piece during which time cutter 79 is in engagement with the work, also during this time the carriage 35 is being continuously moved and carrying the cutter heads toward the headstock of the machine. At the completion of the first half revolution of the work piece it will be noted that both of the cutters 79 and 76 are in engagement with the work and this condition continues for another half revolution of the work piece. At the beginning of the third half revolution the cutter head 75 begins to retract and during the time that the work makes its third half of a revolution the head 75 is retracted, indexed and returned to cutting position bringing the next cutter or chaser into engagement with the work. This cycle of operations is repeated until all of the cutters or chasers on each cutter head have engaged the work and the cutter heads have completed a full revolution to the original position shown in Figure 8.

Figure 4:
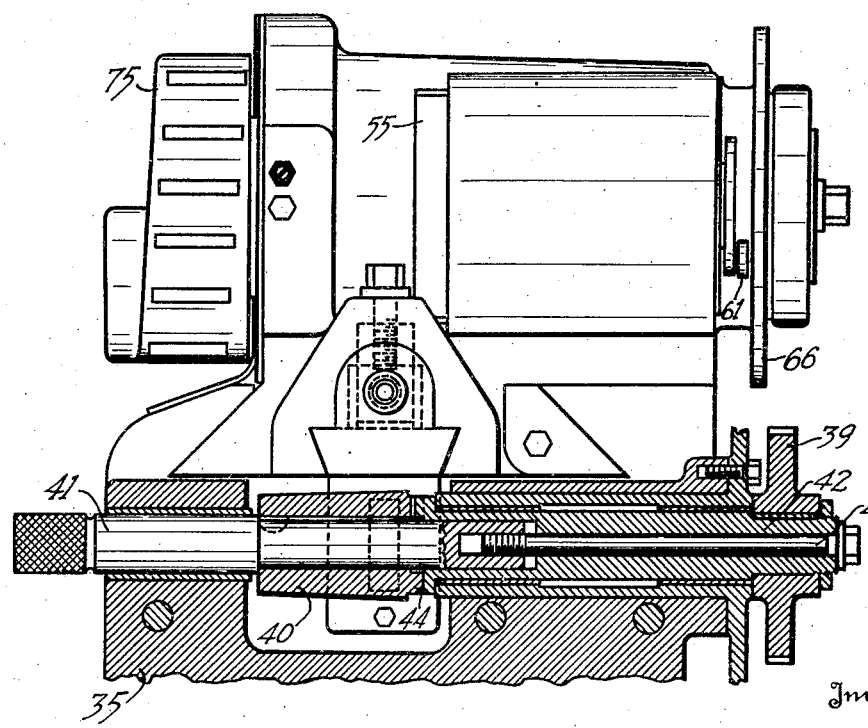
Figure 4 is an enlarged detail view of a cutter head showing the reciprocating mechanism in section.

Since the cutter heads were originally positioned about 8 pitches removed from the end of the thread, it is obvious that after 8 revolutions of the work that the leading edge 99 of the cutters 79, 80 etc. are about to come in contact or interfere with the work holding chuck. The 4 cutters on each head have performed their operation on the work and in order that the subsequent chasers on each head will not interfere with the collet they are set back one or more pitches as shown in Figure 7 and the end of the cutter head relieved as shown more clearly in Figure 4. Theoretically, the chasers on each cutter head should be set back one and one half pitches from the preceding chaser but this is impractical and to compensate for this the chasers are set back first one pitch and then two pitches in alternate sequence from the preceding chasers.

The object of having the chasers set back in this manner is that it tends to shorten the length of the cutter head and by providing each chaser with enough teeth to cut all the threads simultaneously it makes it possible to cut a complete thread in one rotation of the cutter heads and in one reciprocation of the slide 35 rather than in a number of reciprocations of the slide as in the ordinary thread cutting lathe.

After the thread has been completed in this manner the operator throws out the clutch 30 at the completion of the last indexing movement of the head 74 which brings the blank space thereon into cutting position as shown in Figure 8. The slide 35 is then returned to its starting position by the reversible motor not shown driving through the gear 37 on the shaft 28'. This provides for the return of the slide 35 without disturbing the position of the cutter heads.

I claim:

1. In a threading machine having a rotating work holder, a pair of indexable cutter heads reciprocably mounted on opposite sides of the work holder for independent movement toward and from the same, means to back out, index and return one cutter head, while the other cutter is in working position.

2. In a threading machine having a rotating work holder, a pair of indexable cutter heads reciprocably mounted on opposite sides of the work holder for independent movement toward and from the same, means to back out a cutter head to indexing position, means to return a cutter head to working position and power operated means to index a cutter head while in indexing position.

3. In a threading machine having rotating work holder, a pair of indexable cutter heads reciprocably mounted on opposite sides of a work holder for independent movement toward and from the same, resilient means to back out a cutter head from working position, cam means for returning a cutter head to working position and means to index the cutter head.

4. In a screw threading machine having a rotating work holder, a pair of slides reciprocably mounted on opposite sides of a work holder for independent movement toward and from the same, a cutter head adjustably mounted on each slide with respect to the work holder, resilient operating means for each slide to back out the cutter head mounted thereon from working position and cam means to return it to working position.

5. In a thread cutting machine having a rotating work holder and means to rotate the same, a pair of indexable cutter heads cooperatively mounted with respect to the work holder, means to back out, index and return said cutter heads to working position and a common power source for constantly driving all of said means.

6. In a threading machine having a rotatable work holder, a plurality of cutters mounted for cooperation with the work in the work holder comprising a first group of roughing and finishing turning cutters and a second group of roughing and finishing threading cutters and means to place each cutter in working position.

7. In a threading machine having a rotatable work holder, a plurality of cutters mounted for cooperation with the work in the work holder comprising a first group of roughing and finishing turning cutters and a second group of roughing and finishing threading cutters, means to place each cutter in working position and means to feed the cutters longitudinally of the work piece.

8. In a threading machine having a work holder, a pair of indexable cutter heads mounted on opposite sides of the work holder, a plurality of cutters mounted on each cutter head, means to cause a relative rotating movement between the work and the cutters to effect a cutting action, means to feed the cutter heads longitudinally of the work and means to index the cutter heads to place their respective cutters into cutting position.

9. In a threading machine having a work holder, a pair of indexable cutter heads mounted on opposite sides of the work holder, a plurality of cutters mounted on each cutter head, means to cause relative rotating movement between the work and the cutters to effect a cutting action, means to back out, index and return each cutter head to cutting position, and means to effect a longitudinal feeding movement between the cutters and the work.

10. In a threading machine a rotatable work holder, a pair of indexable cutter heads mounted on opposite sides of the work holder, each carrying a plurality of cutters, feeding means for the cutter heads, a prime mover for continuously rotating the work holder and operating the feeding means, and means driven by the prime mover for indexing the cutter heads alternately after each revolution of the work holder.

11. In a machine tool of the class described, a work holder, an indexable cutter head carrying a plurality of cutters for cooperation with the work holder, indexing means for the cutter head comprising a driven member, a continuously operated driving member and means to operatively connect said members upon alternate revolutions of the driving member to index the driven member.

12. In a machine tool of the class described, a work holder, an indexable cutter head carrying a plurality of cutters for cooperation therewith, indexing means for the cutter head comprising a driven member, a reciprocably mounted driving member, means to rotate the driving member and to reciprocate the same into operative engagement with the driven member to thereby index the cutter head.

13. In a machine tool of the class described, a work holder, a pair of indexable cutter heads, means to move the cutter heads in two directions with respect to said work holder, a prime mover for continuously operating said work holder, and a clutch for operatively connecting said means with said prime mover.

14. In a threading machine, a rotatable work holder, a cutter head cooperatively mounted with respect thereto, said cutter head carrying a series of chasers angularly spaced apart thereon and having the same number of cutting teeth, the alternate chasers of said series being longitudinally spaced from the preceeding chaser one pitch and from the following chaser two pitches.

15. In a threading cutting machine, a rotatable work holder, a pair of cutter heads, each head carrying a plurality of chasers, cooperatively mounted with respect thereto and on opposite sides of the work holder, means for rotating the work holder and for feeding the cutter heads longitudinally and means for alternately moving the cutter heads toward and from the work holder during the feeding movement for engaging the work with first a chaser on one cutter head and then a chaser on the other cutter head.

16. In a threading machine having a plurality of chasers adapted to successively engage a work piece, said chasers being progressively step spaced longitudinally with respect to each other, means to feed said chasers longitudinally of a work piece, means to successively move said chasers into engagement with the work, and means acting in cooperation with said feeding means to withdraw each chaser from the work when it is substantially the same longitudinal cutting position.

17. In a threading machine having an indexable cutter head with a plurality of chasers circumferentially spaced thereabout and extending longitudinally thereof, said chasers being progressively stepped back from one end of said cutter head, means to continuously feed said head longitudinally of a work piece, means to laterally reciprocate the cutter head, and means to index the same after each reciprocation to thereby cause successive engagement of the chasers with the work, said reciprocating means acting in cooperation with said feeding means to withdraw each chaser from a work piece when in substantially the same longitudinal cutting position with respect thereto.

18. In a threading machine having a pair of indexable cutter heads on opposite sides of a work piece each head having a plurality of chasers circumferentially spaced thereabout and extending longitudinally thereof, said chasers being progressively stepped back from one end of the cutter head, means to continuously feed said heads longitudinally of the work piece, means to laterally reciprocate the cutter heads and means to index the same after each reciprocation to thereby cause successive engagement of the chasers of each cutter head with the work, said reciprocating means acting in cooperation with said feeding means to withdraw each chaser from the work when in substantially the same longitudinal cutting position with respect thereto.

In testimony whereof I affix my signature.

LOUIS H. BLOOD.